Figure 1:
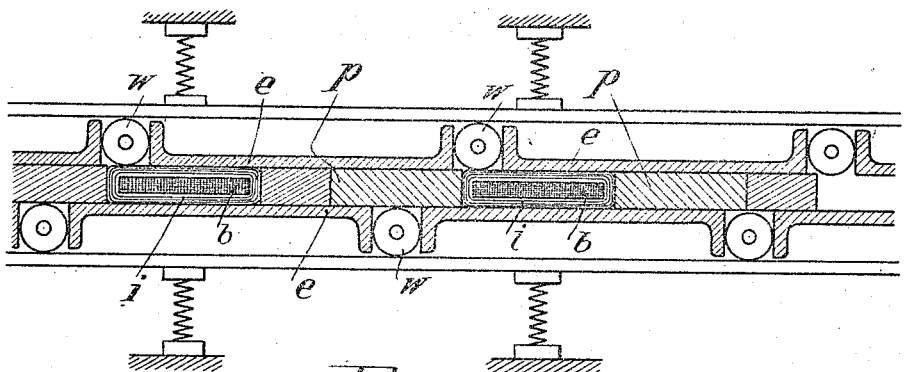

A. FINCKBEIN.
MEANS FOR SMOOTHING AND IRONING THE INSULATING WRAPPING OF ELECTRIC CONDUCTORS.
APPLICATION FILED JAN. 6, 1913.

1,155,345.

Patented Oct. 5, 1915.
2 SHEETS—SHEET 1.

A. FINCKBEIN.
MEANS FOR SMOOTHING AND IRONING THE INSULATING WRAPPING OF ELECTRIC CONDUCTORS.
APPLICATION FILED JAN. 6, 1913.
1,155,345.
Patented Oct. 5, 1915.
2 SHEETS—SHEET 2.
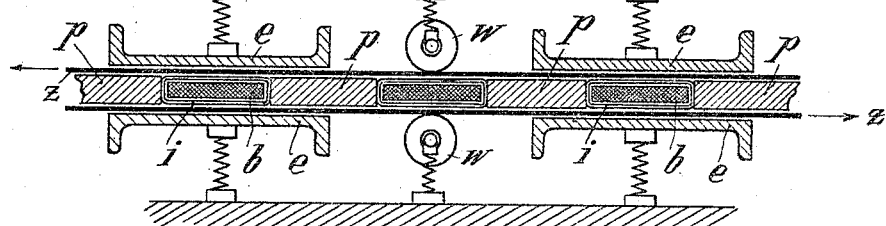
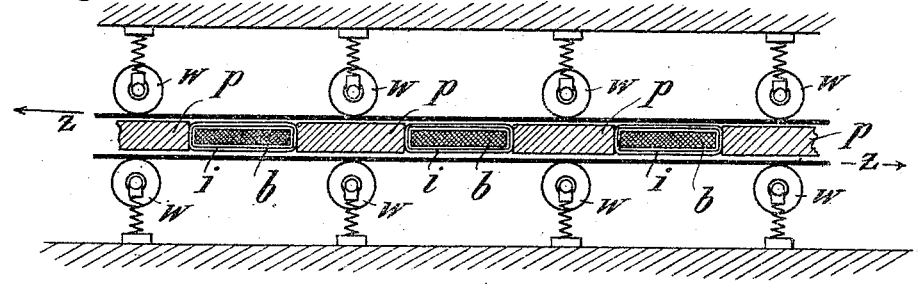
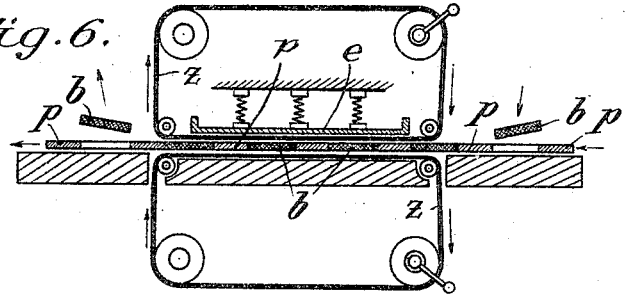
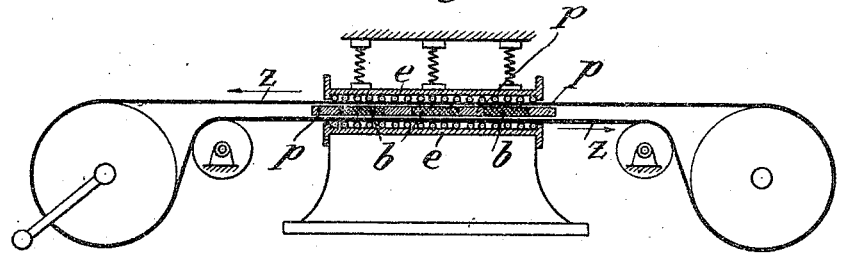

UNITED STATES PATENT OFFICE.

ADOLF FINCKBEIN, OF CHARLOTTENBURG, GERMANY, ASSIGNOR TO SIEMENS-SCHUCKERTWERKE G. M. B. H., A CORPORATION OF GERMANY.

MEANS FOR SMOOTHING AND IRONING THE INSULATING-WRAPPING OF ELECTRIC CONDUCTORS.

1,155,345.  Specification of Letters Patent.  Patented Oct. 5, 1915.

Application filed January 6, 1913. Serial No. 740,458.

*To all whom it may concern:*

Be it known that I, ADOLF FINCKBEIN, a citizen of the German Empire, and residing at Charlottenburg, near Berlin, Germany, have invented certain new and useful Improved Means for Smoothing and Ironing the Insulating-Wrapping of Electric Conductors, of which the following is a specification.

My invention relates to a device for smoothing out and ironing down the insulation of electric conductors and spools, when these have been wrapped with insulating material which is bound together by means of a fusible binder. The bundle of conductors which have been wrapped around must in that case be pressed together while warm and the wrapping must be firmly compressed so that the air inclosed within the material can as far as possible completely escape and the whole become a compact mass of metal and insulating material.

With this object in view the conductors or spools which have been wrapped are, according to my invention, laid longitudinally in between plates offering adequate resistance to pressure, such plates abutting against two sides of the wrapping, and are smoothed over on the two remaining sides by means of pressure plates, rollers or bands, whereby the insulation which has been wrapped on becomes firmly pressed down. Owing to the wrapped conductors or spools being laid in between firmly resisting plates, distortion of the conductors when the insulated covering is being firmly pressed together is effectively prevented, and no damage to the insulation when smoothing it out and ironing it can occur.

In hitherto known devices the conductors or spools have been gripped at two places and the insulation between these two places has been firmly pressed by means of ironers or pressure plates: the motion of these ironers or plates is so arranged that the wrapping becomes firmly pressed down. That portion of the wrapping which lies between the clamping places is by this process liable to be bent out of shape, ruptured or otherwise damaged, whereby the insulation of the bundle of conductors very readily depreciates.

One object of my invention is to avoid these defects, and to this end I arrange that the bundle of conductors to be insulated is protected throughout its entire length against being distorted owing to the use of firmly constructed plates and so grasped and retained between the plates that only that portion of the wrapping remains free which comes under the ironing roller or plate or is in the immediate vicinity of the same. The bundle of conductors may consist of either closed spools or of the various sides of spools or of rods.

The new device may also be constructed in such a manner that the plates and rollers have stationary supports and that a flexible band passes between them and the insulation to be operated on, this band being pressed with the requisite pressure by the plates or rollers and so producing the desired effect. The band may consist of metal or other material and may be employed in one or more endless loops. To facilitate the closed spools being readily inserted and withdrawn, joint-fasteners are arranged at one or more places in the band so that the loop can be readily opened and closed.

The pressure which the plates or rollers exert on the band may be easily regulated by known means, *e. g.* by the adjustment of pressure springs, by variations in the water-pressure or gas-pressure acting on a piston, and so forth. Moreover instead of plates or rollers other pressure means may be employed; for example, pressure could be applied by means of a number of balls located close together either on a rectilinear plane or on a curved surface.

My invention will be more fully understood by reference to the accompanying drawings of which—

Figure 2:
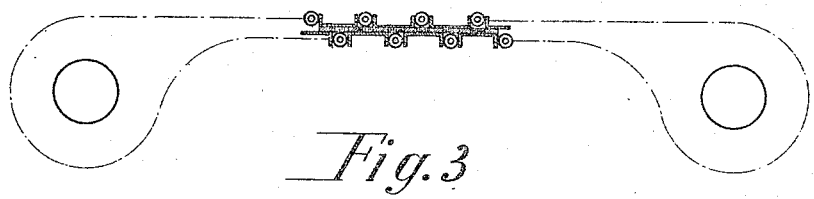
Figure 3:
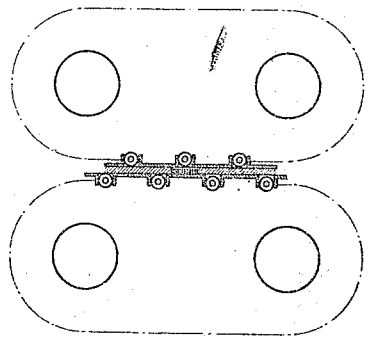

Figure 1 shows a cross-section through an arrangement whereby the conductors are held in position by holding plates which are interposed between a series of rollers and pressure plates one of said series being arranged above and the other below said holding plates. Fig. 2 shows somewhat diagrammatically how the aforementioned pressure plates and rollers are moved over the conductors and their holding plates, Fig. 3 shows a modified construction for moving the pressure plates and rollers, Fig. 4 an arrangement wherein pairs of plates and of rollers are arranged alternately. Fig. 5 a construction wherein only rollers are employed as pressure members, Fig. 6 an arrangement whereby the holding plates of the conductors are moved between two belts which are applied under pressure on either side of said holding plates and said conductors and Fig. 7 an arrangement similar to that of Fig. 2 wherein the holding plates and the interposed conductors are kept at rest, the ironing effect on either side of said plates and conductors being effected by an endless band which is applied under pressure upon the insulation of the conductors.

In Fig. 1 b is a bundle of electrical conductors, i the insulating wrapper which has been wound around the conductors. The conductors are held at the narrow sides of their cross-section by two smooth plates p p, while over both the wider sides of this cross-section one or more plates e and rollers w give a stroking or soothing action in such a direction that they smooth out the insulating material firmly around the bundle of conductors b.

The motion of the plates and rollers is preferably so regulated that while a roller exerts its stroking action over one surface of the cross-section, the other surface is covered by a plate, and in that way the material under the roller becomes uniformly and firmly pressed and smoothed out. This effect can be brought about by giving to the plates a width at least double that of the spools.

For producing the proper motion of the plates and rolls in opposite directions on different sides of the wrapped conductor in the drawings, an endless belt or chain device is shown, see Figs. 6 and 7. It is understood, however, that any equivalent device may be substituted therefor which produces the aforesaid motion between plates and rollers and the surfaces on opposite sides of the wrapped conductor.

In the construction of Fig. 2 the various plates and rollers may be arranged in order to obtain such a closed chain, which exerts a stroking action both on the upper and on the lower sides of the spools.

In Fig. 3 a form of track is employed for the chain, there being here one chain for applying to the upper side and one to the lower side. In place of the rollers w smooth plates may be employed. It is essential only that they smooth out the insulating material in the manner above described. The rollers or plates may be heated in any desired manner in order in each particular case to raise the binder of the insulating material to the melting point.

Further examples of apparatus according to my invention are illustrated in Figs. 4 to 7. Here p indicate the smooth pressure-resisting plates, which hold the conductors b to be insulated and hold them moreover throughout their entire length; the insulating coating is designated by i; z is an endless band which is drawn through between the coating of insulation to be smoothed out and the pressure members, e. g. the plates e and the rollers w. The band z moves in the direction of the arrows so that the direction of motion is opposite on both sides of the bundle of wires or the spool b. The direction of pressure of the plates e and rollers w is likewise indicated by arrows.

The plates and rollers as shown in Fig. 4 press on those portions of the draw-band z which lie upon the insulating coating to be rendered smooth.

The rollers as shown in Fig. 5 are arranged away from those sides of the spools which are operated upon, and they press the band directly onto the plates p serving as the gripping device. Owing to the tensile stress of the band z, the latter will exert pressure on the insulating coating and in a somewhat gentler manner than is the case in Fig. 4.

In Fig. 6 the insulated conductors b are placed in between the plates p at the right-hand side of the figure and carried by hand or any proper mechanism in the direction of the arrows shown laterally thereof, so that they will be ironed by the belts z which travel in opposite direction over the upper and under face of the insulation. The conductors are then removed at the left-hand side from the retaining device. In this arrangement two endless bands (i. e. bands closed on themselves) are employed.

In Fig. 7 the band is guided in the form of a single endless loop. Pressure is transmitted both on the upper and lower band by means of balls which are inserted into both pressure plates. By this means a reduction of the energy spent in friction is effected.

I claim:—

1. An apparatus for smoothing and ironing the insulating wrapping on electrical conductors of the kind specified, comprising abutment plates adapted to abut longitudinally against a conductor to hold the same in position and so as to expose said wrapping on two opposite sides, and means for ironing said two opposite sides of said wrapping, whereby the same will be compressed and drawn tight, substantially as described.

2. An apparatus for smoothing and ironing the insulating wrapping on electrical conductors of the kind specified, comprising rigid abutment plates adapted to abut longitudinally against a conductor so as to expose two opposite sides of said wrapping, and pressure means for ironing said wrapping on a side thus exposed, whereby the same will be compressed and drawn tight, substantially as described.

3. An apparatus for smoothing and ironing the insulating wrapping on electrical conductors of the kind specified, comprising rigid abutment plates adapted to abut longitudinally against a conductor so as to expose two opposite sides of said wrapping, pressure members abutting against both of said exposed sides of said wrapping, means for producing relative movement between said pressure members and said wrapping, said movement being transverse to the conductors and the movement of said pressure members on opposite sides of said wrapping being in opposite directions, whereby an ironing effect will be exerted upon said wrapping and the same compressed and drawn tight, substantially as described.

4. An apparatus for smoothing and ironing the insulating wrapping on electrical conductors of the kind specified, comprising rigid abutment plates adapted to abut longitudinally against a conductor so as to expose two opposite sides of said wrapping, pressure members, abutting against both of said exposed sides of said wrapping, and means for producing movement of said pressure members on one of said exposed sides oppositely to those on the other side, whereby an ironing effect will be exerted upon said wrapping and the same compressed and drawn tight, substantially as described.

5. An apparatus for smoothing and ironing the insulating wrapping on electrical conductors of the kind specified, comprising rigid abutment plates adapted to abut against the entire length of a conductor on two opposite sides of its wrapping, pressure plates and pressure rollers abutting against the two remaining sides of said wrapping, said pressure plates and rollers being adapted to move in opposite direction on said two sides of the wrapping, and means for producing relative movement between said pressure plates and rollers and said sides of said wrapping against which they respectively abut, said movement being transverse to the conductors, the movement of said pressure plates and rollers being in opposite directions on opposite sides of said wrapping, whereby an ironing effect will be exerted upon said wrapping for compressing and drawing same tight.

In testimony whereof I have signed my name to this specification in the presence of two witnesses.

ADOLF FINCKBEIN.

Witnesses:
HENRY HASPER,
WOLDEMAR HAUPT.